(12) United States Patent
Wu et al.

(10) Patent No.: US 11,190,321 B2
(45) Date of Patent: Nov. 30, 2021

(54) REFERENCE SIGNAL TRANSMISSION METHOD, NETWORK SIDE APPARATUS, AND USER EQUIPMENT

(71) Applicant: HUAWEI TECHNOLOGIES CO., LTD., Guangdong (CN)

(72) Inventors: Ye Wu, Shanghai (CN); Yong Liu, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/401,686

(22) Filed: May 2, 2019

(65) Prior Publication Data

US 2019/0260542 A1  Aug. 22, 2019

Related U.S. Application Data

(63) Continuation of application No. PCT/CN2017/100560, filed on Sep. 5, 2017.

(30) Foreign Application Priority Data

Nov. 4, 2016  (CN) .......................... 201610966176.1

(51) Int. Cl.
*H04W 24/08* (2009.01)
*H04L 5/00* (2006.01)
(Continued)

(52) U.S. Cl.
CPC .............. *H04L 5/0051* (2013.01); *H04B 7/04* (2013.01); *H04B 7/0456* (2013.01); *H04L 5/00* (2013.01);
(Continued)

(58) Field of Classification Search
None
See application file for complete search history.

(56) References Cited

U.S. PATENT DOCUMENTS 9,125,135 B2 * 9/2015 Parkvall ................ H04W 48/08
9,491,750 B2 * 11/2016 Park ...................... H04W 4/025
(Continued)

FOREIGN PATENT DOCUMENTS

| CN | 101330321 A | 12/2008 |
|----|-------------|---------|
| CN | 102742176 A | 10/2012 |

(Continued)

OTHER PUBLICATIONS

International Search Report, dated Oct. 27, 2017, in International Application No. PCT/CN2017/100560 (5 pp.).
(Continued)

*Primary Examiner* — Sithu Ko
(74) *Attorney, Agent, or Firm* — Leydig, Voit & Mayer, Ltd.

(57) ABSTRACT

A reference signal transmission method is provided, including: generating, by a network side device, a transmission unit, where the transmission unit includes a user equipment-specific demodulation reference signal UE-specific DM-RS, a time-frequency region for unicast control, and a user-specific data time-frequency region; and sending the transmission unit to user equipment, where the UE-specific DM-RS is reused or shared to demodulate the time-frequency region for unicast control and the user-specific data time-frequency region.

11 Claims, 12 Drawing Sheets

(51) Int. Cl.
*H04B 7/0456* (2017.01)
*H04W 72/04* (2009.01)
*H04B 7/04* (2017.01)

(52) U.S. Cl.
CPC ......... *H04L 5/0007* (2013.01); *H04W 72/042* (2013.01); *H04W 72/044* (2013.01)

(56) References Cited

U.S. PATENT DOCUMENTS

| | | | |
|---|---|---|---|
| 9,491,751 B2 * | 11/2016 | Park | H04W 72/046 |
| 9,955,320 B2 * | 4/2018 | Parkvall | H04L 41/0803 |
| 2008/0318608 A1 | 12/2008 | Inoue et al. | |
| 2011/0176517 A1 | 7/2011 | Hu et al. | |
| 2012/0250642 A1 * | 10/2012 | Qu | H04W 48/12 |
| | | | 370/329 |
| 2013/0064196 A1 * | 3/2013 | Gao | H04W 72/04 |
| | | | 370/329 |
| 2013/0294366 A1 * | 11/2013 | Papasakellariou | H04L 5/005 |
| | | | 370/329 |
| 2014/0092827 A1 * | 4/2014 | Jongren | H04L 25/0222 |
| | | | 370/329 |
| 2014/0321345 A1 * | 10/2014 | Li | H04W 52/54 |
| | | | 370/311 |
| 2014/0348099 A1 | 11/2014 | Kim et al. | |
| 2014/0369311 A1 | 12/2014 | Bi et al. | |
| 2015/0236932 A1 * | 8/2015 | Yu | H04B 17/309 |
| | | | 370/252 |
| 2016/0065341 A1 | 3/2016 | Yoo et al. | |
| 2016/0112994 A1 * | 4/2016 | Wang | H04W 72/042 |
| | | | 370/329 |
| 2016/0211959 A1 * | 7/2016 | Jongren | H04L 5/0048 |
| 2016/0270057 A1 * | 9/2016 | Yu | H04W 16/18 |
| 2017/0099656 A1 * | 4/2017 | Seo | H04L 5/0048 |
| 2017/0181138 A1 | 6/2017 | Li et al. | |
| 2017/0367046 A1 * | 12/2017 | Papasakellariou | H04L 5/0048 |
| 2018/0091276 A1 * | 3/2018 | Huang | H04L 5/0051 |
| 2019/0045488 A1 * | 2/2019 | Park | H04B 7/024 |
| 2019/0052442 A1 * | 2/2019 | Kim | H04W 72/048 |
| 2019/0261380 A1 * | 8/2019 | Iyer | H04B 7/0695 |
| 2019/0342061 A1 * | 11/2019 | Kim | H04W 72/0473 |

FOREIGN PATENT DOCUMENTS

| | | |
|---|---|---|
| CN | 103312389 A | 9/2013 |
| CN | 103312649 A | 9/2013 |
| WO | 2013019031 A2 | 2/2013 |
| WO | 2014073928 A1 | 5/2014 |

OTHER PUBLICATIONS

"DM-RS based Distributed and Localized E-PDCCH structure," 3GPP TSG RAN WG1 Meeting #67, San Francisco, USA, R1-114396, pp. 1-4, 3rd Generation Partnership Project, Valbonne, France (Nov. 14-18, 2011).

"Consideration on Reference Signal for E-PDCCH," 3GPP TSG RAN WG1 Meeting #67, San Francisco, USA, R1-113932, pp. 1-5, 3rd Generation Partnership Project, Valbonne, France (Nov. 14-18, 2011).

"DM-RS for E-PDCCH with TxD," 3GPP TSG RAN WG1 Meeting #68, Dresden, Germany, R1-120409, pp. 1-4, 3rd Generation Partnership Project, Valbonne, France (Feb. 6-10, 2012).

"Reference signals for enhanced control channels," 3GPP TSG-RAN, WG1 #67, San Francisco, R1-113678, pp. 1-2, 3rd Generation Partnership Project, Valbonne, France (Nov. 14-18, 2011).

"Motivation, requirements and design for ePHICH," 3GPP TSG-RAN1 #69, Prague, Czech Republic, R1-122073, pp. 1-4, 3rd Generation Partnership Project, Valbonne, France (May 21-25, 2012).

"DMRS reuse for data and control," 3GPP TSG-RAN WG1 #86, Gothenburg, Sweden, R1-167038, pp. 1-3, 3rd Generation Partnership Project, Valbonne, France (Aug. 22-26, 2016).

"Discussions on sPDSCH for latency reduction," 3GPP TSG RAN WG1 Meeting #86bis, Lisbon, Portugal, R1-1609215, pp. 1-6, 3rd Generation Partnership Project, Valbonne, France (Oct. 10-14, 2016).

* cited by examiner

REFERENCE SIGNAL TRANSMISSION METHOD, NETWORK SIDE APPARATUS, AND USER EQUIPMENT

CROSS-REFERENCE TO RELATED APPLICATIONS

This application is a continuation of International Application No. PCT/CN2017/100560, filed on Sep. 5, 2017, which claims priority to Chinese Patent Application No. 201610966176.1, filed on Nov. 4, 2016. The disclosures of the aforementioned applications are hereby incorporated by reference in their entireties.

TECHNICAL FIELD

The present invention relates to the communications field, and more specifically, to a reference signal transmission method, a network side apparatus, and user equipment.

BACKGROUND

With rapid development of communications technologies, a high speed, a large capacity, and wide coverage become main features of a modern communications system. Therefore, it appears to be particularly important to resolve non-ideal feature problems such as serious signal fading and interference between signals that are caused due to an increasing communications range and more complex and diversified communications environments.

SUMMARY

To improve performance of a communications system, implementations of the present invention provide a reference signal transmission method, a network side device, and user equipment.

According to an aspect, a reference signal transmission method is provided, including: generating, by a network side device, a transmission unit, where the transmission unit includes a user equipment-specific demodulation reference signal UE-specific DM-RS, a time-frequency region for unicast control, and a user-specific data time-frequency region; and sending the transmission unit to user equipment, where the UE-specific DM-RS is reused or shared to demodulate the time-frequency region for unicast control and the user-specific data time-frequency region. Preferably, in the transmission unit, the user-specific data time-frequency region is not after the time-frequency region for unicast control in time domain.

Preferably, the method includes: allocating, to the user equipment, at least one antenna port configured to send the UE-specific DMRS, where reference signals sent on at least some antenna ports are not only used to demodulate the user-specific data time-frequency region, but also used to demodulate the time-frequency region for unicast control.

Correspondingly, a processing method corresponding to the UE is provided, and details are not described herein.

According to another aspect, a reference signal transmission method is provided, including:

generating, by a network side device, a transmission unit, where the transmission unit includes a shared demodulation reference signal shared DM-RS specific to a user group and one or more time-frequency regions with a physical layer function, the user group includes at least one user equipment, and no precoding is performed on the shared DM-RS, or same precoding is performed on the shared DM-RS for user equipments in the user group; and sending the transmission unit to the user group, so that all users in the user group demodulate one or more of the time-frequency regions with a physical layer function by using the shared DM-RS.

The time-frequency regions with a physical layer function include one or any combination of the following time-frequency regions: a time-frequency region for shared control, a time-frequency region for unicast control, a time-frequency region for UE-specific control, a time-frequency region for physical control format indication, or a time-frequency region for data multicast/broadcast.

The method further includes: allocating one or more shared DM-RS ports to the user group, where at least some of the shared DM-RS ports are reused or shared to demodulate at least two of the time-frequency regions with a physical layer function.

According to another respect, a reference signal transmission method on a UE side is provided, including: receiving, by user equipment, a shared demodulation reference signal shared DM-RS specific to a user group, where the user group includes at least one user equipment, and no precoding is performed on the shared DM-RS, or same precoding is performed on the shared DM-RS for user equipments in the user group; and obtaining, by the user equipment through demodulation by using the shared DM-RS, information in a time-frequency region with a physical layer function.

The time-frequency region with a physical layer function includes one or any combination of the following time-frequency regions: a time-frequency region for shared control, a time-frequency region for unicast control, a time-frequency region for UE-specific control, a time-frequency region for physical control format indication, or a time-frequency region for data multicast/broadcast.

The method further includes: receiving, by the user equipment, one or more shared DM-RS ports allocated to the user group, where at least some of the shared DM-RS ports are reused or shared to demodulate at least two time-frequency regions with a physical layer function.

Correspondingly, according to other aspects, a network side device and user equipment that perform the foregoing methods are provided.

DESCRIPTION OF EMBODIMENTS

Figure 1A:
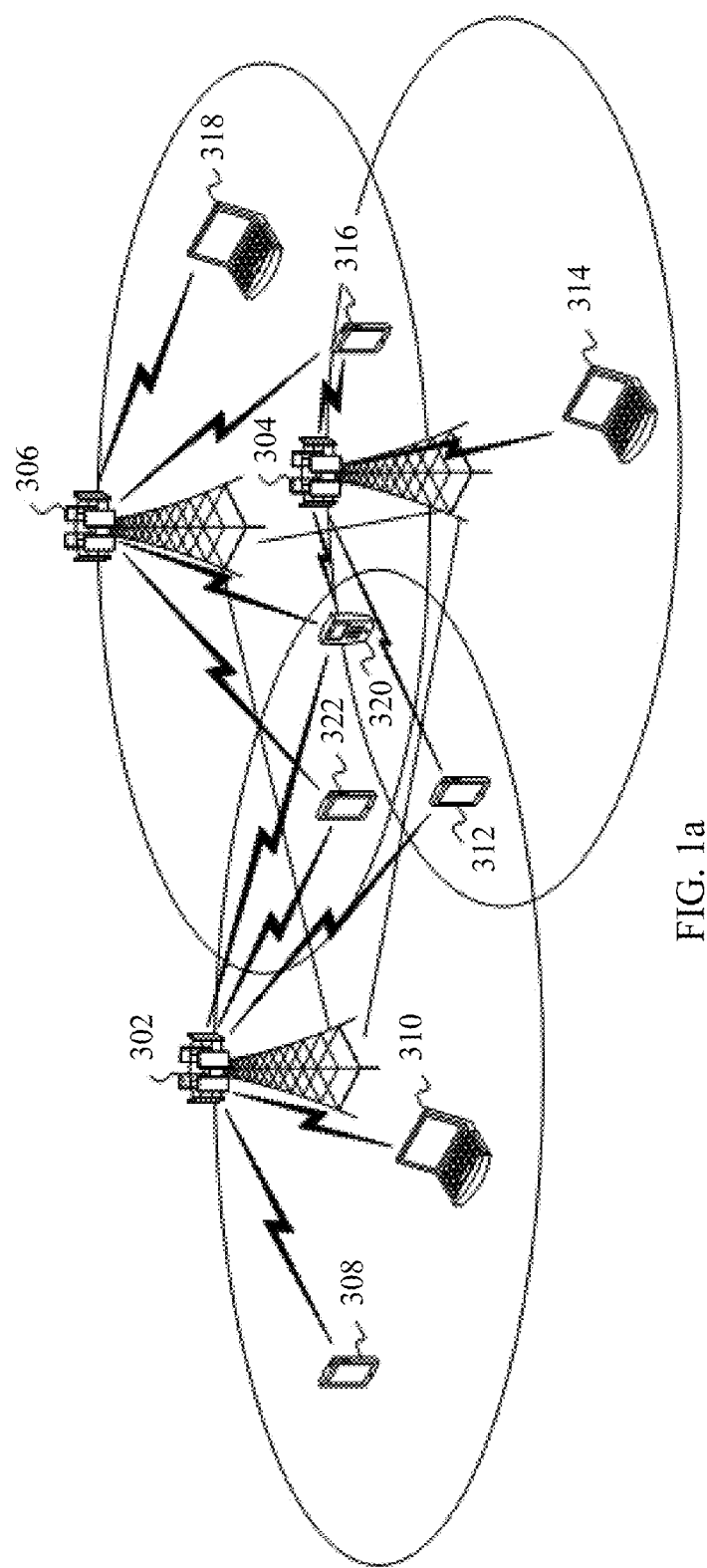
FIG. 1a is a simple schematic diagram of a system according to an implementation of the present invention.

Features of various aspects and examples embodiments of the present invention are described below in detail. Many specific details are provided in the following detailed description, to provide a full understanding of the present invention. However, apparently, a person skilled in the art may implement the present invention without some of the specific details. The embodiments are described below only to provide a better understanding of the present invention by showing examples of the present invention. The present invention is definitely not limited to any specific configuration and algorithm provided below, but covers any modification, replacement, and improvement made to an element, a component, and an algorithm without departing from the spirit of the present invention. In the accompanying drawings and the following descriptions, well-known structures and technologies are omitted, so as not to unnecessarily obscure the present invention.

At present, the example implementations are comprehensively described with reference to the accompanying drawings. However, the example implementations can be implemented in a plurality of manners, and it should not be understood that the example implementations are limited to the example implementations described herein. On the contrary, by providing these implementations, the present invention is more comprehensive and complete, and a concept of the example implementations is comprehensively conveyed to a person skilled in the art. For clarity, thicknesses of a region and a layer may be exaggerated in the figures. A same reference numeral in the figures represents a same or similar structure, and therefore detailed descriptions of the structure are omitted.

In addition, the described features, structures, or characteristics may be combined in one or more embodiments in any proper manner. In the following descriptions, many specific details are provided to provide a full understanding of the embodiments of the present invention. However, a person skilled in the art should be aware that the technical solutions in the present invention may be implemented without one or more of the specific details, or by using another method, element, material, or the like. In other cases, well-known structures, materials, or operations are not shown or described in detail, so as not to obscure the main technical idea of the present invention.

It should be noted that the embodiments in this application and the features in the embodiments may be mutually combined in the case of no conflict. This application is described below in detail with reference to the accompanying drawings and the embodiments.

Definitions of Acronyms and Key Terms

MIMO multi-input multi-output multiple input multiple output
OFDM orthogonal frequency-division multiplexing orthogonal frequency-division multiplexing
HD-MIMO high dimensional MIMO high dimensional multiple input multiple output
CRS cell-specific reference signal cell-specific reference signal
DM-RS demodulation reference signal demodulation reference signal
UE user equipment user equipment
CSI-RS channel state information-reference signal channel state information-reference signal
LTE Long Term Evolution Long Term Evolution
eNodeB evolved NodeB evolved NodeB
PDCCH physical downlink control channel physical downlink control channel
ePDCCH enhanced physical downlink control channel enhanced physical downlink control channel
PDSCH physical downlink shared channel physical downlink shared channel
CQI channel quality indicator channel quality indicator
LS least square least square
RE resource element resource element
SRS sounding reference signal sounding reference signal In a demodulation process at a receive end in a communications system, compared with incoherent demodulation, coherent demodulation has better performance and has an advantage of approximately 3 dB. Therefore, the coherent demodulation is more widely used in a modern communications system. However, in an OFDM system, each carrier is suppressed during modulation, and coherent demodulation at a receive end requires a reference signal. The reference signal is also referred to as a pilot signal or a reference signal (Reference Signal, RS). Reference signals are distributed on different resource elements (Resource Element, resource element) in time-frequency two-dimensional space in an OFDM symbol, and amplitudes and phases of the reference signals are known. Likewise, in a MIMO system, each transmit antenna (a virtual antenna or a physical antenna) has an independent data channel. A receiver performs channel estimation for each transmit antenna, and restores transmit data based on the channel estimation.

Channel estimation is a process of reconstructing a receive signal to compensate for channel fading and noise. During channel estimation, an RS predicted by a transmitter and a receiver is used to track a time domain change and a frequency domain change of a channel. For example, to implement channel quality measurement and data demodulation in a higher order multiple-antenna system, a plurality of pilot symbols: a cell-specific reference signal (Cell-specific reference signal, CRS), a demodulation reference signal (Demodulation Reference Signal, DM-RS), and a channel state information-reference signal (Channel State Information-Reference Signal, CSI-RS) are separately defined in an LTE-A system. Each DM-RS is in a one-to-one correspondence with each physical downlink shared channel (Physical Downlink Share Channel, PDSCH) (DM-RS-PDSCH mapping for short), and the DM-RS is used to demodulate a corresponding PDSCH. The CSI-RS is used to report information such as a channel quality indicator (Channel Quality Indicator, CQI), a precoding matrix indicator (Precoding Matrix Indicator, PMI), and a rank indicator (Rank Indicator, RI). Specifically, the CRS is used to measure downlink channel quality, so as to perform resource scheduling and support a link adaptation technology. Therefore, the CRS needs to be sent at all available frequency bands, in all subframes, and on antenna ports. A same precoding manner is used for the DM-RS and user equipment data, and the precoding manner has the following features: (1) The DM-RS is specific to user equipment (UE-specific), to be specific, a same precoding matrix is used for each piece of terminal data and a demodulation reference signal corresponding to the terminal data. (2) From a perspective of a network side, DM-RSs transmitted at layers are mutually orthogonal or approximately orthogonal. (3) The DM-RS is usually used to support a beamforming technology and a precoding technology, and therefore is sent only on a scheduled resource block. A quantity of sent DM-RSs is in proportion to a quantity of data streams instead of a quantity of transmit antennas. In summary, in the LTE-A, a PDCCH is demodulated by using the CRS, a related PDSCH is demodulated by using the CRS or the DM-RS, an ePDCCH is demodulated by using the DM-RS, and a related PDSCH is demodulated by using the DM-RS. In this case, the PDSCH and the ePDCCH cross same time (namely, OFDM symbols).

FIG. 1a is an example schematic diagram of a wireless communications network 300 according to an embodiment of the present invention. As shown in FIG. 1a, the wireless communications network 300 includes base stations 302 to 306 and user equipments 308 to 322. The base stations 302 to 306 may communicate with each other over a backhaul (backhaul) link (as shown by a straight line between the base stations 302 to 306). The backhaul link may be a wired backhaul link (for example, an optical fiber or a copper cable), or may be a wireless backhaul link (for example, a microwave). The user equipments 308 to 322 may communicate with the corresponding base stations 302 to 306 over a radio link (as shown by a broken line between the base stations 302 to 306 and the user equipments 308 to 322).

The base stations 302 to 306 are configured to provide a wireless access service for the user equipments 308 to 322. Specifically, each base station is corresponding to a service coverage area (which may also be referred to as a cellular, as shown in each elliptic area in FIG. 1a). User equipment that enters the area may communicate with the base station by using a wireless signal, to accept a radio access service provided by the base station. Service coverage areas of the base stations may overlap. User equipment in an overlapping area may receive wireless signals from a plurality of base stations. Therefore, the plurality of base stations may simultaneously provide a service for the user equipment. For example, the plurality of base stations may provide a service for the user equipment in the overlapping area by using a coordinated multipoint (Coordinated multipoint, CoMP) technology. For example, as shown in FIG. 1a, service coverage areas of the base station 302 and the base station 304 overlap, and the user equipment 312 is located in the overlapping area. Therefore, the user equipment 312 may receive wireless signals from the base station 302 and the base station 304, and the base station 302 and the base station 304 may simultaneously provide a service for the user equipment 312. For another example, as shown in FIG. 1a, service coverage areas of the base station 302, the base station 304, and the base station 306 have a common overlapping area, and the user equipment 320 is located in the overlapping area. Therefore, the user equipment 320 may receive wireless signals from the base station 302, the base station 304, and the base station 306, and the base station 302, the base station 304, and the base station 306 may simultaneously provide a service for the user equipment 320.

Depending on a used wireless communications technology, the base station may also be referred to as a NodeB (NodeB), an evolved NodeB (evolved NodeB, eNodeB), an access point (Access Point, AP), or the like. In addition, based on a size of a provided service coverage area, the base stations may be further classified into a macro base station for providing a macro cell (Macro cell), a micro base station for providing a micro cell (Pico cell), and a femto base station for providing a femto cell (Femto cell). With continuous evolution of the wireless communications technologies, a future base station may use another name.

The user equipments 308 to 318 may be various wireless communications devices with a wireless communication function, for example without limitation to, a mobile cellular phone, a cordless phone, a personal digital assistant (Personal Digital Assistant, PDA), a smartphone, a notebook computer, a tablet computer, a wireless data card, a wireless modem (Modulator demodulator, Modem), or a wearable device such as a smartwatch. With emergence of an Internet of Things (Internet of Things, IOT) technology, increasingly more devices previously having no communication function, for example without limitation to, a household appliance, a transportation vehicle, a tool device, a service device, and a service facility, start to obtain a wireless communication function by configuring a wireless communications unit, to access a wireless communications network, and accept remote control. This type of devices have the wireless communication function because the wireless communications unit is configured for this type of devices, and therefore this type of devices also belong to wireless communications devices. In addition, the user equipments 308 to 318 may also be referred to as a mobile station, a mobile device, a mobile terminal, a wireless terminal, a handheld device, a client, and the like.

A plurality of antennas may be configured for each of the base stations 302 to 306 and each of the user equipments 308 to 322, to support a MIMO (multiple-input multiple-output, Multiple Input Multiple Output) technology. Further, the user equipments 308 to 322 may not only support a single user MIMO (Single User MIMO, SU-MIMO) technology, but also support multi-user MIMO (Multi-User MIMO, MU-MIMO). The MU-MIMO may be implemented based on a space division multiple access (Space Division Multiple Access, SDMA) technology. Because a plurality of antennas are configured, the base stations 302 to 306 and the user equipments 308 to 322 may further flexibly support a single input single output (Single Input Single Output, SISO) technology, a single-input multiple-output (Single Input Multiple Output, SIMO) technology, and a multiple-input single-output (Multiple Input Single Output, MISO) technology, to implement various diversity technologies (for example without limitation to, transmit diversity, and receive diversity) and multiplexing technologies. The diversity technologies may include, for example without limitation to, a transmit diversity (Transmit Diversity, TD) technology and a receive diversity (Receive Diversity, RD) technology. The multiplexing technology may be a spatial multiplexing (Spatial Multiplexing) technology. In addition, the foregoing various technologies may further include a plurality of implementation solutions. For example, the transmit diversity technology may include diversity manners such as space-time transmit diversity (Space-Time Transmit Diversity, STTD), space-frequency transmit diversity (Space-Frequency Transmit Diversity, SFTD), time switched transmit diversity (Time Switched Transmit Diversity, TSTD), frequency switched transmit diversity (Frequency Switched Transmit Diversity, FSTD), orthogonal transmit diversity (Orthogonal Transmit Diversity, OTD), and cyclic delay diversity (Cyclic Delay Diversity, CDD), and diversity manners obtained through derivation and evolution, and by combining the foregoing various diversity manners. For example, currently, transmit diversity manners such as space time block coding (Space Time Block Coding, STBC), space frequency block coding (Space Frequency Block Coding, SFBC), and CDD are used in an LTE (Long Term Evolution, Long Term Evolution) standard.

In addition, the base station 302 and the user equipments 304 to 310 may communicate by using various wireless communications technologies, for example without limitation to, a Time Division Multiple Access (Time Division Multiple Access, TDMA) technology, a Frequency Division Multiple Access (Frequency Division Multiple Access, FDMA) technology, a Code Division Multiple Access (Code Division Multiple Access, CDMA) technology, a Time Division-Synchronous Code Division Multiple Access (Time Division-Synchronous Code Division Multiple Access, TD-SCDMA) technology, an orthogonal frequency division multiple access (Orthogonal FDMA, OFDMA) technology, a single carrier frequency division multiple access (Single Carrier FDMA, SC-FDMA) technology, a space division multiple access (Space Division Multiple Access, SDMA) technology, and evolved and derived technologies of these technologies. As a radio access technology (Radio Access Technology, RAT), the foregoing wireless communications technologies are adopted in many wireless communications standards, thereby constructing various well-known wireless communications systems (or networks), including but not limited to a Global System for Mobile Communications (Global System for Mobile Communications, GSM), CDMA 2000, wideband CDMA (Wideband CDMA, WCDMA), Wi-Fi defined in an 802.11 standard family, Worldwide Interoperability for Microwave Access (Worldwide Interoperability for Microwave Access, WiMAX), Long Term Evolution (Long Term Evolution, LTE), LTE-Advanced (LTE-Advanced, LTE-A), evolved systems of these wireless communications systems, and the like. Unless otherwise specified, the technical solutions provided in the embodiments of the present invention may be applied to the foregoing various wireless communications technologies and wireless communications systems. In addition, the terms "system" and "network" may be interchanged with each other. It should be noted that the wireless communications network 300 shown in FIG. 1*a* is merely used as an example, and is not intended to limit the technical solutions of the present invention. A person skilled in the art should understand that in a specific implementation process, the wireless communications network 300 further includes other devices, for example without limitation to, a base station controller (Base Station Controller, BSC). In addition, a quantity of base stations and a quantity of user equipments may also be configured based on a specific requirement.

Figure 1B:
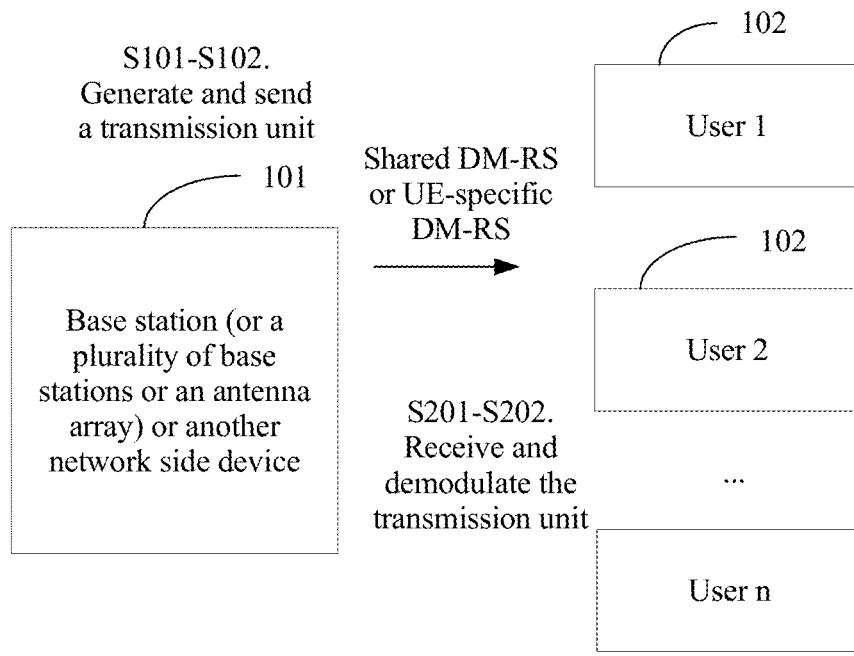
FIG. 1b and FIG. 1c each are simple schematic diagrams of a system and a process according to an implementation of the present invention.

In another implementation, FIG. 1*b* is a communications system that is briefly described, including a network side device 101 and a plurality of user equipments (a user 1, a user 2, . . . , and a user n). The network side device 101 is configured to send information by using one or more time-frequency regions with a physical layer function. Specifically, the information is mainly information shared between more than two user equipments, or information sent to a specific user. Certainly, though it is rare, there may be only one user equipment in the communications system. Though the information that is shared is shared information, but is actually received by only one user equipment.

The time-frequency regions with a physical layer function include relatively centralized time-frequency regions, and certainly also include some relatively dispersed time-frequency regions. The "time-frequency region" may also be referred as to a "channel". In the following description, the name channel "channel" is used as an example, and a specific form of the time-frequency region is not limited.

For example, the channel is a shared control channel (shared control channel), a unicast control channel (Unicast control channel), a UE-specific control channel (UE-specific control channel), a physical control format indicator channel (PCFICH), or a multicast/broadcast data channel (Multicast/broadcast data channel) in a downlink.

For another example, the channel is an uplink control channel (UL control channel) in an uplink.

The shared control channel is used to carry control information usually shared by at least two UEs (certainly, in few cases, the control information may alternatively be received by only one terminal in the communications system). The shared control information is control information that needs to be received by a plurality of UEs in a group group, for example, paging paging of grouped user equipments, system information system information, and a RACH response. When there is both the shared control channel and the unicast control channel (Unicast control channel) in the communications system, the shared control channel (shared control channel) further includes at least information indicating a time-frequency resource occupied by a unicast control channel used by UE. The grouped user equipments are a plurality of user equipments that are simultaneously served in various communications systems. In a new network system (for example, 5G), the grouped user equipments may be UEs in one cell, or in a communications system, no cell cell is defined, and only a user equipment group is defined.

For example, in a high frequency communications system, because a beamforming technology is used, a service scope is limited, and service is provided on a basis of a user equipment group.

The unicast control channel (Unicast control channel) is used to carry control information related to a unicast data channel (Unicast data channel) of UE. The control information may include a reference signal RS used for CSI measurement, and an indication, a configuration, and the like for measurement and reporting, and may further include information required by the UE for data demodulation, including a time-frequency location of a resource allocated to the unicast data channel of the UE, a demodulation reference signal port, an MCS, and the like.

The UE-specific control channel (UE-specific control channel) is used to carry user equipment specific UE-specific control information, including resource allocation information resource block assignment, a modulation and coding scheme MCS, a HARQ, uplink resource allocation (UL resource allocation), uplink power control (UL power control), an uplink SRS request (UL SRS request), or the like. A DL grant is also carried on the UE-specific control channel, and the DL grant is an indication of a time-frequency location of a data channel.

The physical control format indicator channel PCFICH is used to indicate a time-frequency location of the shared control channel or a UE-specific unicast control channel.

The multicast/broadcast data channel multicast/broadcast data channel is used to perform data broadcast/multicast transmission for at least one UE, particularly for a plurality of UEs.

The uplink control channel (UL control channel) is used to carry UE-specific control information such as CSI feedback and ACK/NACK.

The foregoing channels are described only from a perspective of function. A distribution pattern of the channels in a time-frequency region is not limited, and there may be a new channel including the foregoing more than one time-frequency regions with a physical layer function.

In an implementation of the present invention, a shared demodulation reference signal shared DM-RS is provided, and may be applied to the wireless communications system shown in FIG. 1*a* and FIG. 1*b*. In addition, a user equipment-specific demodulation reference signal UE-specific DM-RS is provided.

In this implementation, the shared DM-RS is different from a CRS stipulated in LTE-A and a DM-RS stipulated in LTE-A. The CRS needs to be used at full bandwidth, and in addition to a demodulation function, the CRS is further used for CSI measurement and the like. The shared DM-RS may be used at full bandwidth or a subband, and the shared DM-RS is used only for data channel demodulation or control channel demodulation. The shared DM-RS is a demodulation DM-RS used by at least one UE (a plurality of UEs in most cases) to demodulate a shared channel (a control channel or a data channel). For a channel estimation function when the shared DM-RS is used for demodulation, the shared DM-RS does not need to be used for deduction to obtain feedback information of channel quality and spatial quality. The shared channel includes at least one or any combination of the foregoing PCFICH, the shared control channel, the unicast control channel, and the multicast/broadcast data channel (similar to an MBSFN). In addition, the shared DM-RS may be further used to support a channel demodulated by only one UE, for example, the unicast unicast control channel. The shared DM-RS may be used at a subband level. The UE-specific DM-RS is used to demodulate a UE-specific data channel, a UE-specific data control channel, or a UE-specific unicast control channel, and cannot be used to demodulate more channels of the UE. The UE-specific DM-RS may be used at a subband level. For details, refer to stipulation in standards such as LTE, and no repeated description of the UE-specific DM-RS is provided in this specification. However, a new time-frequency structure of the UE-specific DM-RS is provided in some implementations below.

Comparatively speaking, in LTE release 8, spatial multiplexing can be implemented at a maximum of four layers by using a maximum of four cell-specific reference signals with reference to precoding signaling for UE data transmission, and in LTE release 9, two-layer spatial multiplexing based on a beamforming technology is provided based on non-codebook precoding by using a precoded UE-specific reference signal. In LTE-Advanced, the precoding method continues to be used, to support downlink SU-MIMO at a maximum of eight layers.

However, in this implementation, no precoding may be performed on the shared DM-RS, or same precoding may be performed for different UEs. In this way, a same DM-RS symbol can be reused (reuse) or shared, to reduce overheads of the shared DM-RS. Specifically, a plurality of examples of a time-frequency structure of the shared DM-RS and the user-specific DM-RS are provided in an implementation of the present invention.

The shared DM-RS may be carried on consecutive subcarriers or consecutive OFDM symbols. Alternatively, the shared DM-RS may be carried on discrete subcarriers or discrete OFDM symbols.

In addition, the shared DM-RS may be carried only at some subbands. Alternatively, the shared DM-RS may be carried at entire operating bandwidth, namely, a wideband. The wideband is full bandwidth of a communications channel. For example, the communications channel is a carrier such as 20 MHz, 10 MHz, . . . , and 1.4 MHz defined in LTE. The subband is a part of the wideband in a broad sense, and a size of the subband is further stipulated in a protocol.

In an implementation of the present invention, a plurality of shared DM-RS ports or a plurality of UE-specific DM-RS ports based on a multiple-antenna technology are provided. Specifically, a DM-RS port is an antenna port configured to send a DM-RS. A wireless channel over which a symbol on the antenna port is transmitted may be inferred from a wireless channel over which another symbol (a DM-RS) on the same antenna port is transmitted. (An antenna port is defined such that the channel over which a symbol on the antenna port is conveyed can be inferred from the channel over which another symbol on the same antenna port is conveyed.) More specifically, the shared DM-RS port is allocated to more than one user equipment (a user group) for use. These user equipments may obtain transmission parameters in respective other time-frequency regions with a physical layer function by performing estimation by using the same shared DM-RS antenna port, so that information in the time-frequency region with a physical layer function can be obtained through demodulation. For example, the time-frequency region with a physical layer function is for example one or any combination of the foregoing channels: the shared control channel, the unicast control channel, the UE-specific control channel, the physical control format indicator channel, or the multicast/broadcast data channel. The UE-specific DM-RS port is an antenna port used to send a UE-specific DM-RS.

A network side device allocates one or more shared DM-RS ports or one or more UE-specific DM-RS ports to user equipment. Based on the foregoing description about the shared DM-RS port and the UE-specific DM-RS port, in a preferred implementation, at least two of the shared control channel, the unicast control channel, the PCFICH, and the multicast/broadcast data channel may use at least one same shared DM-RS port. To be specific, some shared DM-RS ports are reused (reuse) or shared to demodulate two or more time-frequency regions (a data channel or a control channel) with a physical layer function. Therefore, it is unnecessary to send a demodulation reference signal for each data channel or control channel, reducing resource waste, and improving system transmission efficiency. When the shared DM-RS port that can be reused or shared is precoding, specifically, corresponding precoding that is reused for at least two channels is the same as precoding for the shared DM-RS port. Three types of precoding are involved herein: the precoding for the shared DM-RS port that is reused or shared, precoding that is for the reused or shared port and that is corresponding to a channel 1, and precoding that is for the reused or shared port and that is corresponding to a channel 2. The three types of precoding are the same. Similarly, the UE-specific DM-RS port may also be reused or shared. In other words, a reference signal sent on the reused or shared UE-specific DM-RS port is not only used to demodulate a UE-specific data channel, but also used to demodulate a UE-specific unicast control channel.

If there is a unicast control channel and a UE-specific data channel in a subframe, the UE-specific data channel is not located after the unicast control channel in the subframe in terms of time.

Examples of the implementations designed for the channels and the shared demodulation reference signal are provided below by using time-frequency structures of transmission units (for example, physical layer subframes) shown in FIG. 2 to FIG. 10. Elements followed in the reference signal time-frequency structure may be replaced and combined without violating logic. Details are not described in this specification.

For example, when there is a unicast control channel and a shared control channel in a subframe, the shared control channel is not located after the unicast control channel in the subframe in terms of time.

For another example, when there is a shared control channel and a multicast/broadcast data channel in a subframe, the multicast/broadcast data channel is not located before the shared control channel in the subframe in terms of time.

For another example, when there is a unicast control channel and a UE-specific data channel in a subframe, the UE-specific data channel is not located after the unicast control channel in the subframe in terms of time.

For another example, at least one UE-specific DM-RS port may be not only used to demodulate a UE-specific data channel, but also used to demodulate a UE-specific unicast control channel. In other words, the unicast control channel and the UE-specific data channel may use at least one same UE-specific DM-RS port.

Figure 2:
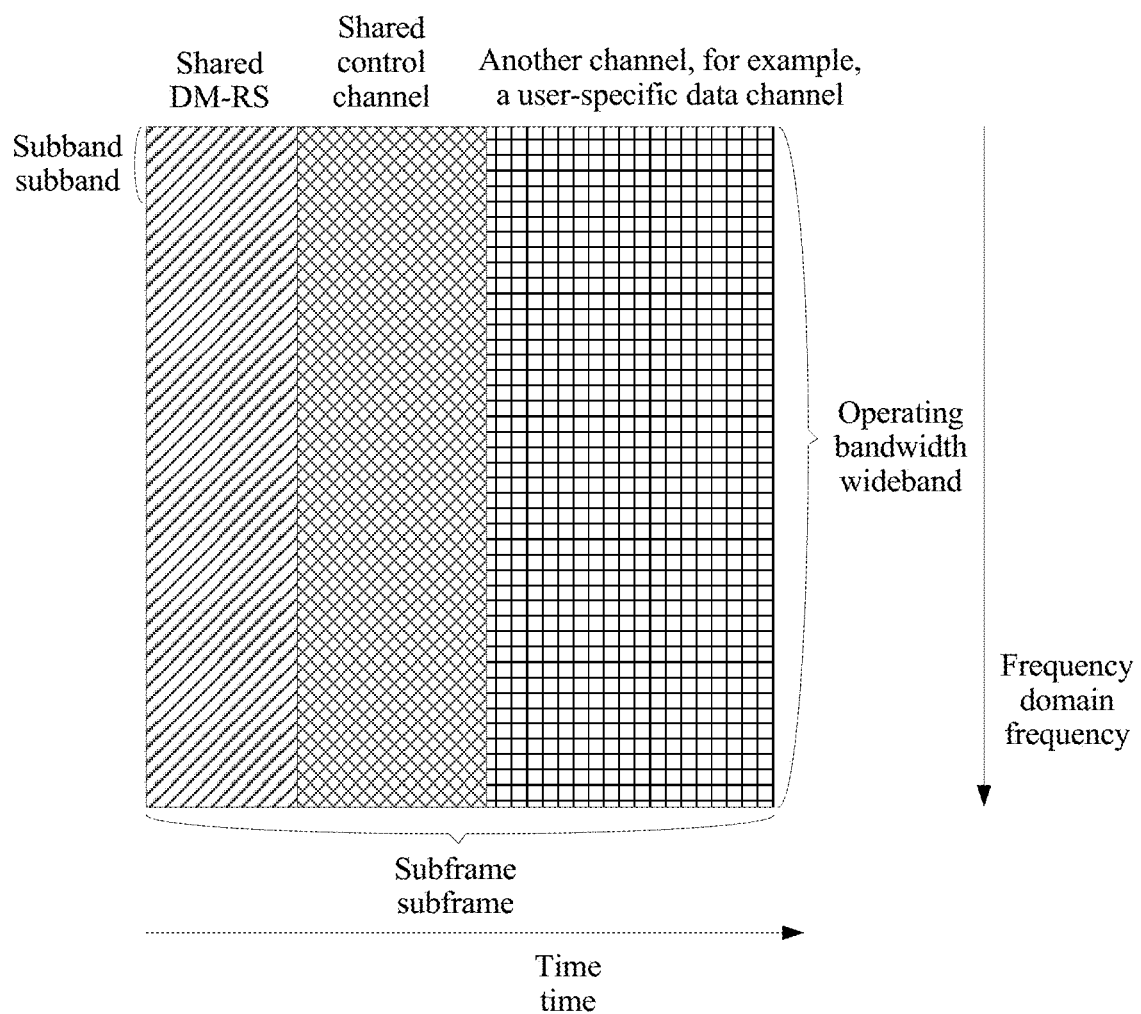
FIG. 2 to FIG. 10 each are schematic diagrams of a time-frequency structure of a transmission unit according to different implementations of the present invention.

In a time-frequency structure 1 of a transmission unit shown in FIG. 2, a shared DM-RS occupies consecutive subcarriers or OFDM symbols, and the shared DM-RS occupies a wideband.

Figure 3:
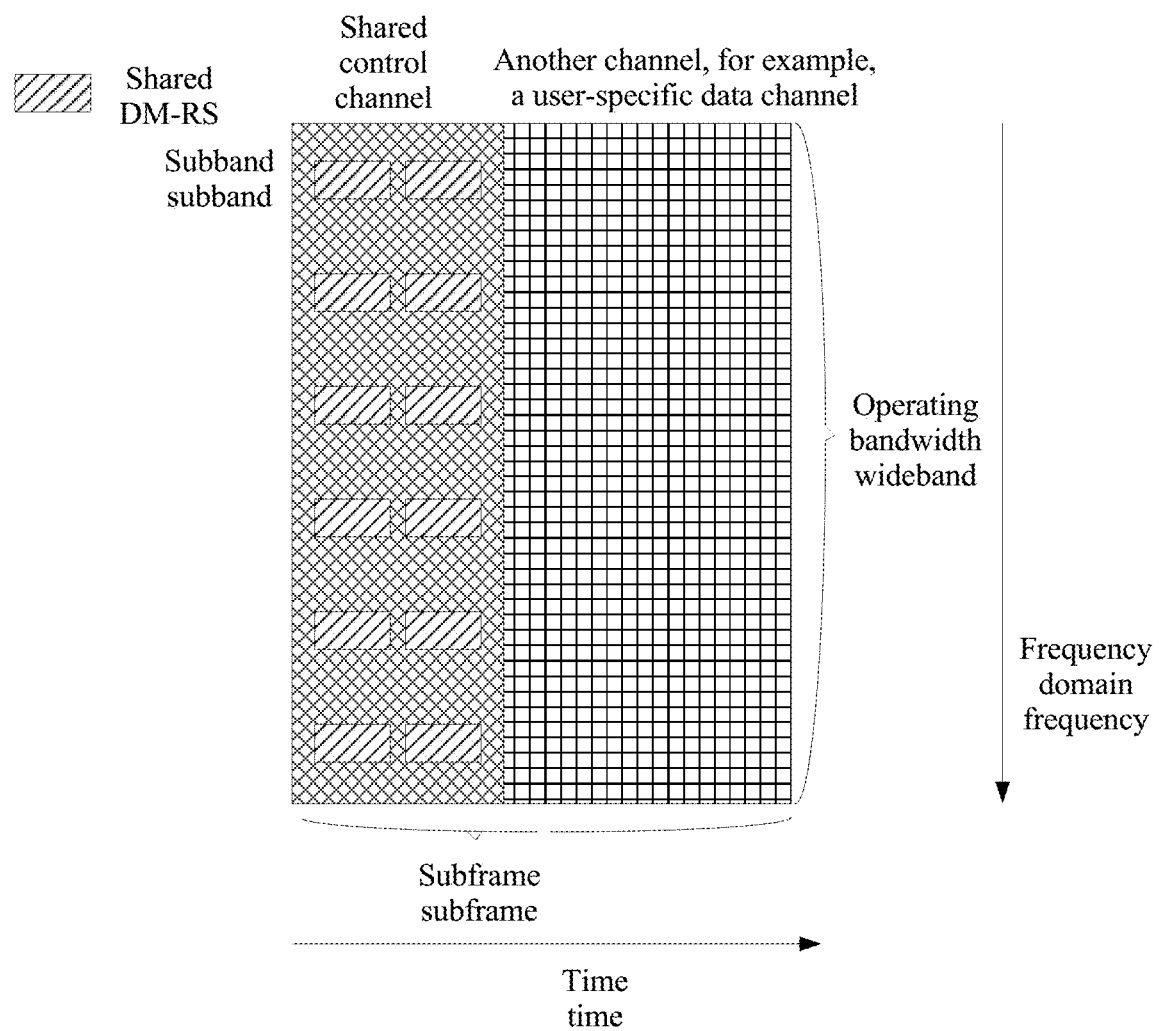

In a time-frequency structure 2 of a transmission unit shown in FIG. 3, a shared DM-RS may be placed in a form of discrete subcarriers or discrete OFDM symbols (or may be placed on only one column of OFDM symbols).

Figure 4:
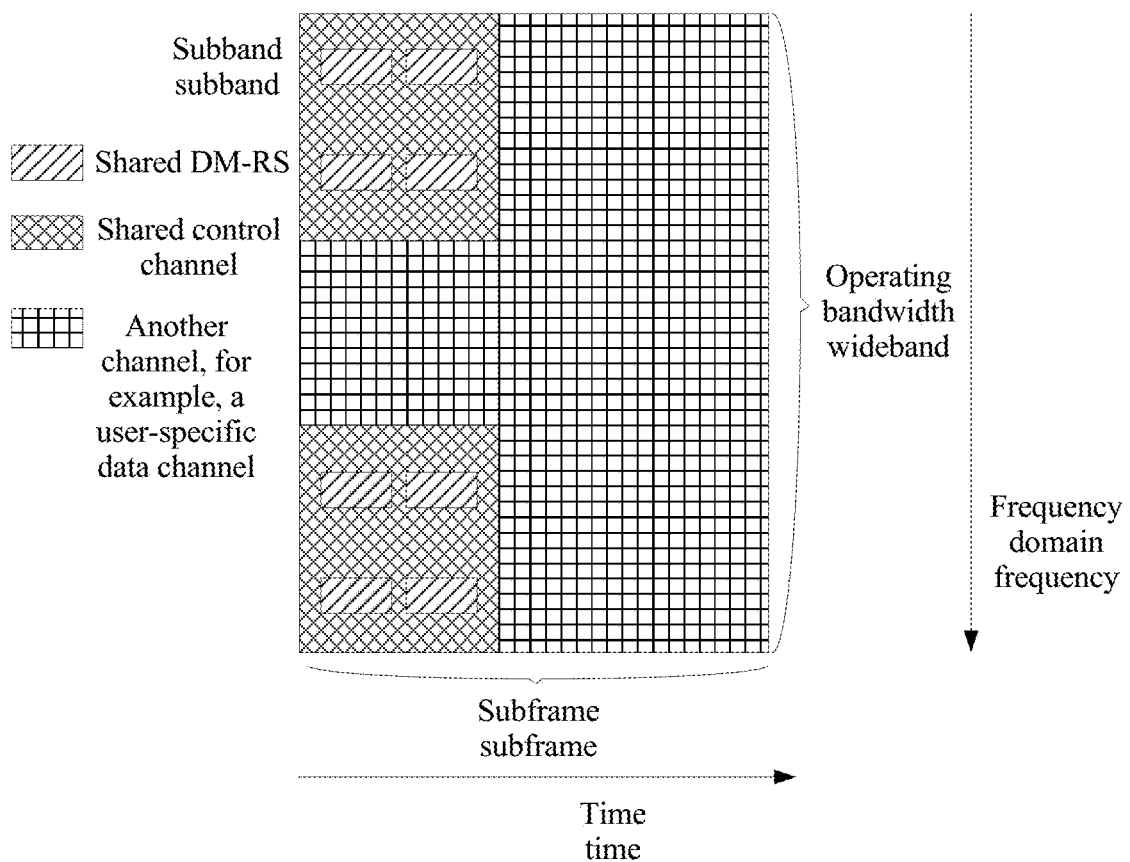

A time-frequency structure 3 of a transmission unit shown in FIG. 4 is similar to the reference signal time-frequency structure 2, but a shared control channel is carried at some subbands subbands, and does not occupy entire operating bandwidth.

Figure 5:
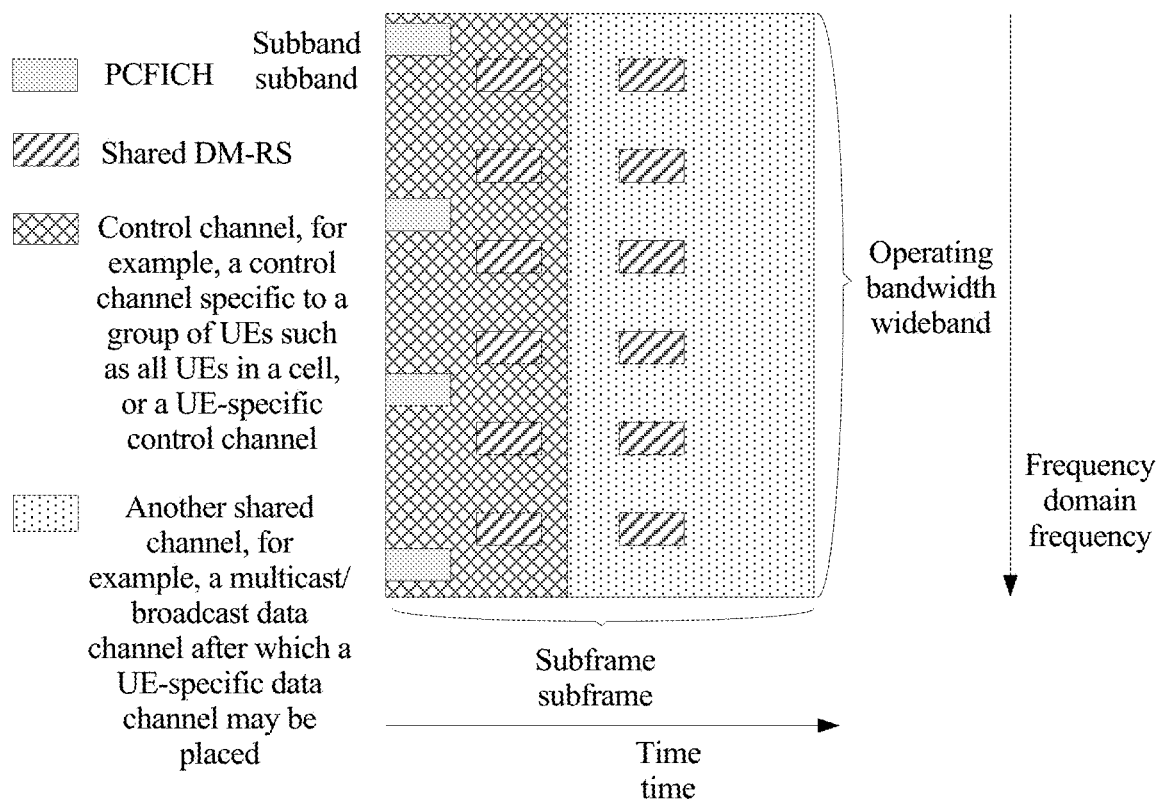

In a time-frequency structure 4 of a transmission unit shown in FIG. 5, a physical control format indicator channel PCFICH is demodulated by using a DM-RS. The PCFICH requires a shared DM-RS to provide enough pattern density, to ensure relatively high demodulation accuracy. In other words, the DM-RS needs to be close enough to the PCFICH in a time-frequency location, to ensure relatively high demodulation accuracy.

Figure 6:
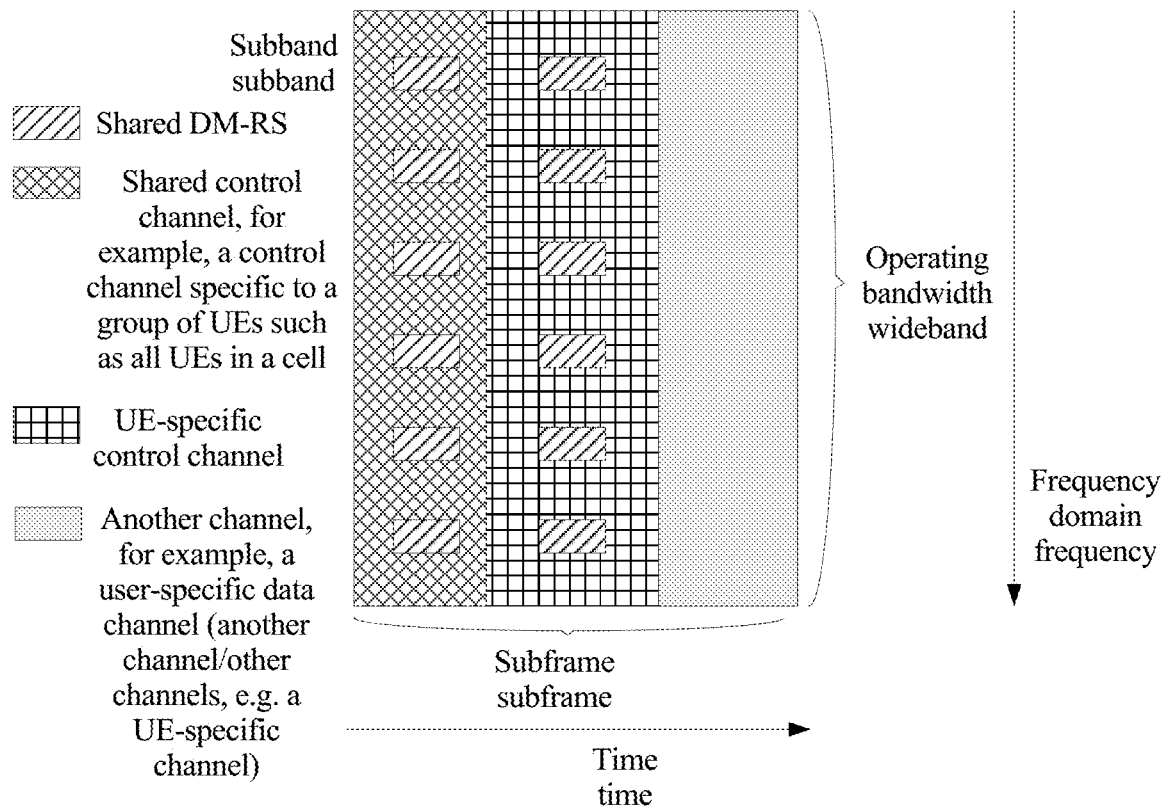
Figure 7:
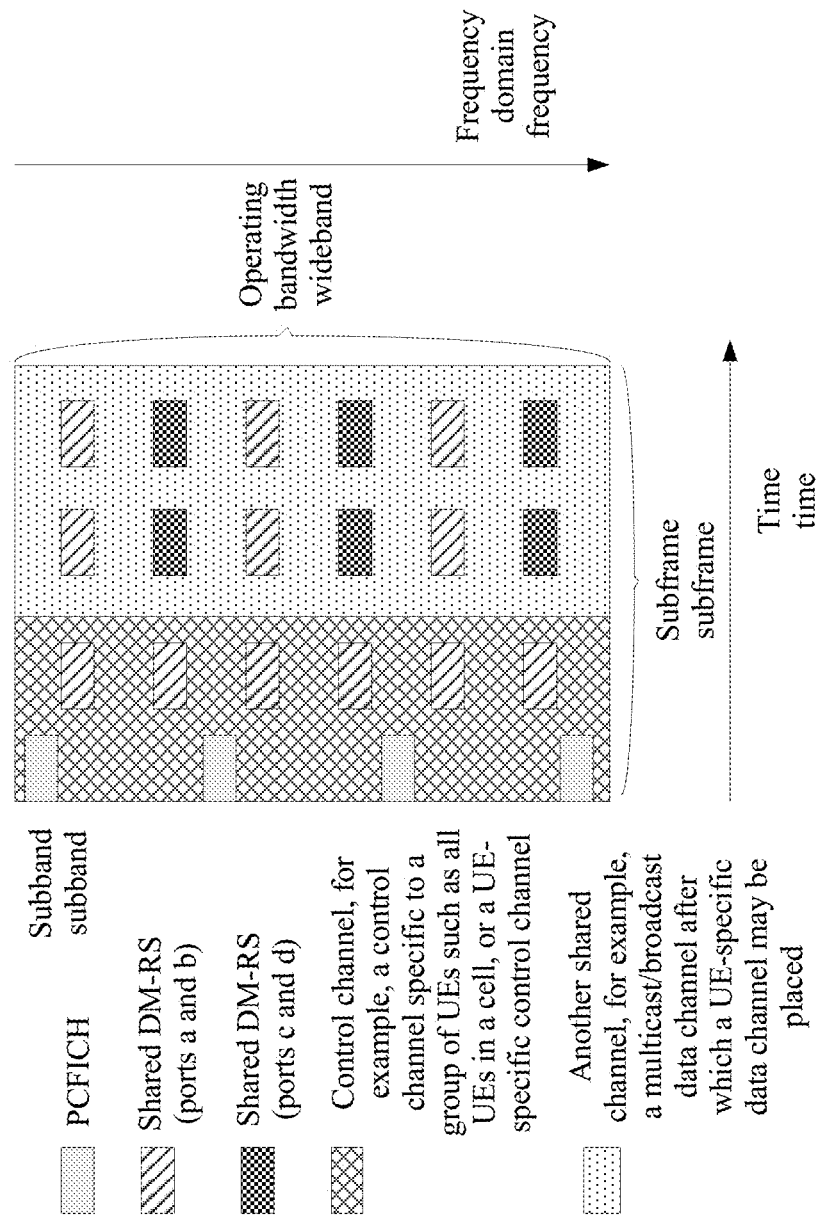

In a time-frequency structure 5 of a transmission unit shown in FIG. 6, a shared control channel and a UE-specific control channel are used as an example. In a subframe, the shared control channel is located before the UE-specific control channel in terms of time, and both the shared control channel and the UE-specific control channel are demodulated based on a shared DM-RS.

Similarly, when there is a unicast control channel and a shared control channel in a subframe, the shared control channel is not located after the unicast control channel in the subframe in terms of time. When the shared DM-RS is reused or shared for demodulation, if there is a unicast control channel and a UE-specific data channel in a subframe, the UE-specific data channel is not before the unicast control channel.

As described above, in a specific example, at least two of the shared control channel, the unicast control channel, the PCFICH, and the multicast/broadcast data channel may use at least one same shared DM-RS port. With reference to a time-frequency structure 6 of a transmission unit shown in FIG. 7, ports a and b are used to demodulate a shared control channel, and ports a, b, c, and d are used to demodulate a multicast/broadcast data channel.

A reference signal time-frequency structure of a user equipment-specific demodulation reference signal UE-specific DM-RS is further provided in an implementation of the present invention.

Figure 8:
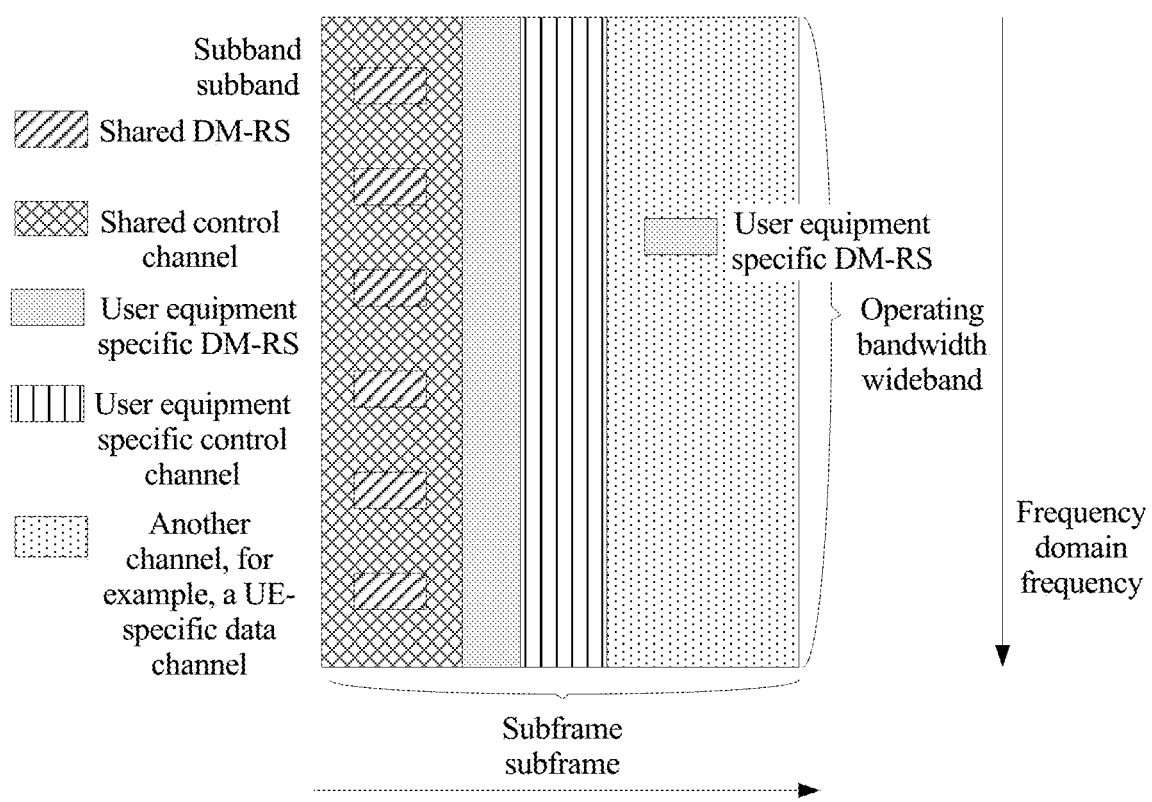

In a reference signal time-frequency structure 1 of a UE-specific DM-RS shown in FIG. 8, when a UE-specific DM-RS is used for a UE-specific control channel, if there is a unicast control channel and a shared control channel in a subframe, the shared control channel is not located after the unicast control channel in the subframe in terms of time.

Figure 9:
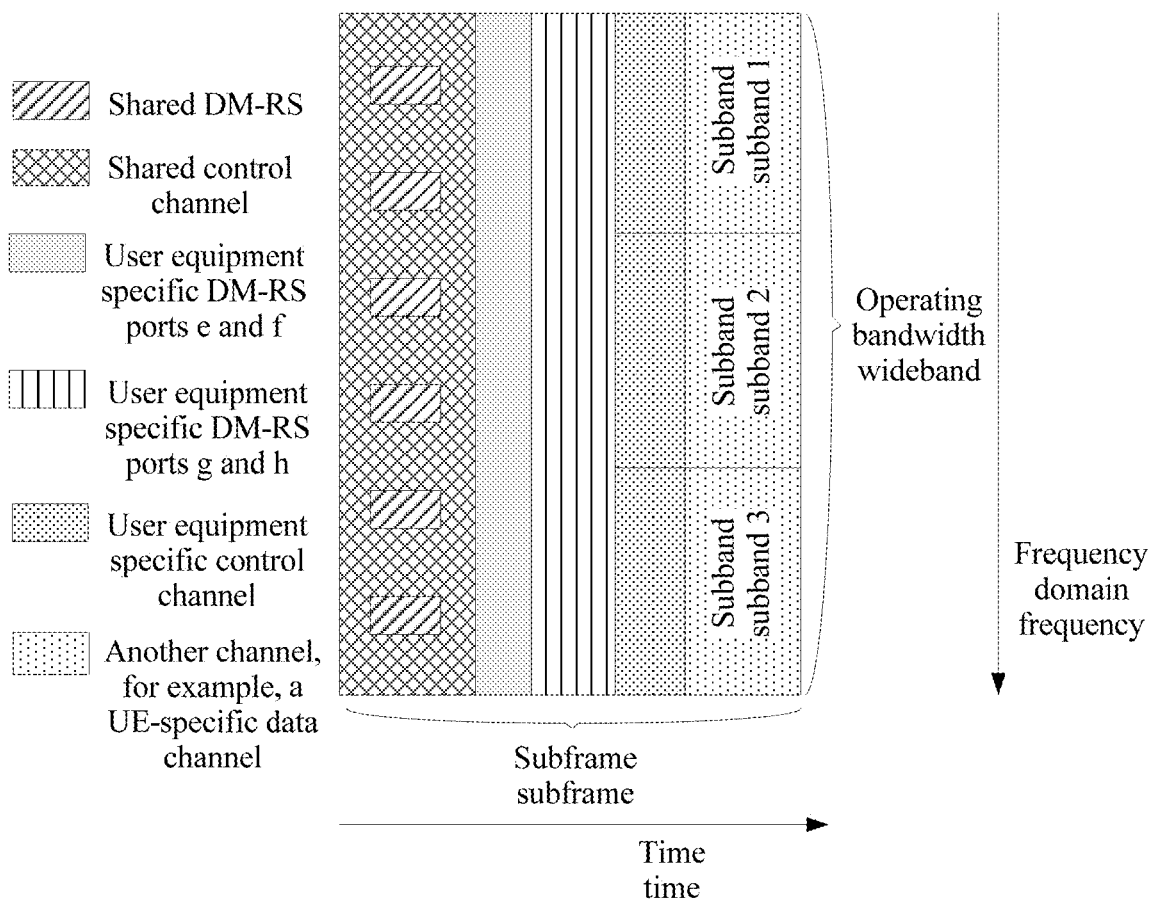

In a reference signal time-frequency structure 2 of a UE-specific DM-RS shown in FIG. 9, when a UE-specific DM-RS is used for a UE-specific control channel, at least one UE-specific DM-RS port may be not only used to demodulate a UE-specific data channel, but also used to demodulate a UE-specific unicast control channel. As shown in FIG. 9, ports e and f are used to demodulate the UE-specific unicast control channel, and ports e, f, g, and h are used to demodulate the UE-specific data channel. Specifically, same precoding is used for the UE-specific DM-RS port that is reused for demodulation and used for a plurality of corresponding demodulated channels. In the foregoing example, for UE, precoding used for a UE-specific DM-RS sent on the port e or f, precoding used for a signal sent on the UE-specific unicast control channel, and precoding used for a signal sent on the UE-specific data channel are the same.

Figure 10:
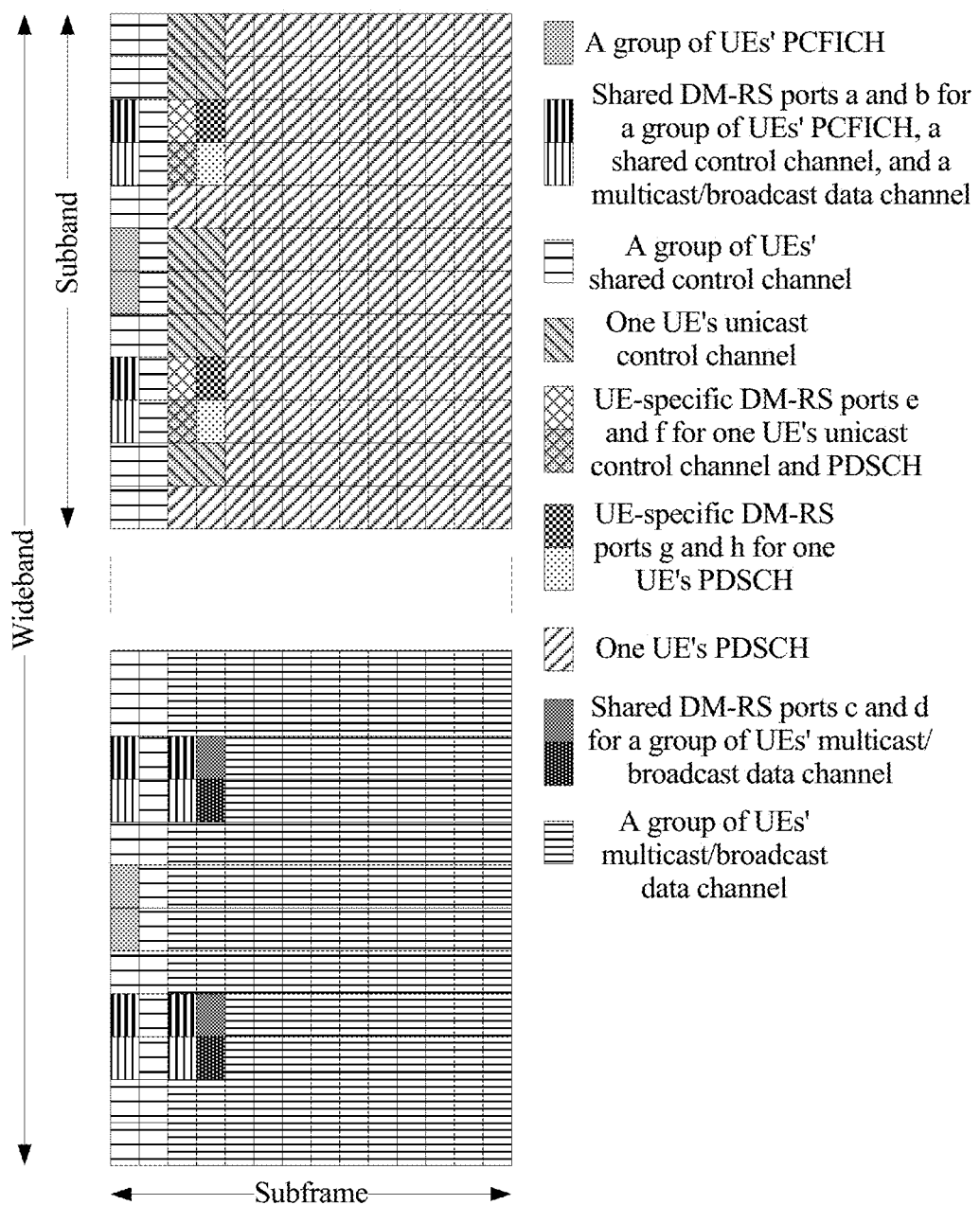

Elements in the foregoing reference signal time-frequency structures may be combined in a case of no logic conflict. Only a reference signal time-frequency structure shown in FIG. 10 is used as an example in this specification. In a subframe in a reference signal time-frequency structure 7 shown in FIG. 10, an entire operating band wideband includes a plurality of subbands subbands. In a time sequence, at a subband 1, the following time periods are included.

In a first time period, a shared control symbol or a shared control resource element RE corresponding to a user equipment group 1 is included, and a PCFICH of the user equipment group 1 is included at a center location of the subband in frequency domain. In the first time period, a symbol on a shared DM-RS port a and a symbol on a shared DM-RS port b are closer to the PCFICH. The symbols on the shared DM-RS ports a and b are used to demodulate the PCFICH, a shared control channel shared control channel, and a multicast/broadcast data channel multicast/broadcast data channel of the user equipment group.

In a second time period, a unicast control symbol of single user equipment is included on some REs of the subband, and symbols that are on UE-specific DM-RS ports e and f and that are used to demodulate a unicast control channel and a downlink data channel PDSCH of user equipment and symbols that are on UE-specific DM-RS ports g and h and that are used to demodulate a downlink data channel PDSCH of user equipment are included on other subcarriers. Some downlink data symbols may be included on some subcarriers.

In a third time period, downlink data symbols of some user equipments are included on all subcarriers of the subband. Preferably, the user equipment is user equipment in the user group 1, or may be any user equipment in some cases.

At another subband 2, there is a similar reference signal time-frequency structure in a first time period.

In a second time period, a shared DM-RS port a and a shared DM-RS port b are carried on some subcarriers of the subband n. The shared DM-RS ports a and b are used to demodulate a PCFICH, a shared control channel shared control channel, and a multicast/broadcast data channel multicast/broadcast data channel of a user equipment group 2. A shared DM-RS port c and a shared DM-RS port d are carried on other subcarriers. The shared DM-RS ports c and d are used to demodulate multicast/broadcast data of a user equipment group. A multicast/broadcast data channel of a user equipment group is carried on another subcarrier.

It should be noted that preferably, some channels with a physical layer function may be corresponding to different user groups in different frequency domains. In other words, the channels are corresponding to some user equipments at some subbands, and corresponding to other user groups at other subbands. For example, the user group 1 at the subband 1 and the user group 2 at the subband 2 are different user groups. In other words, the user group 1 and the user group 2 include at least one different user equipment.

In some systems, there is no user group or there is only one user group (for example, a cell) for some channels with a physical layer function. Each of the foregoing subbands is used to perform transmission with a plurality of users who are not grouped or at least one user equipment in a unique user group.

Correspondingly, with reference to FIG. 1b, a downlink is used as an example, and a method on a transmitter side is provided in another implementation, and includes the following steps.

S101. A network side device generates a transmission unit that includes a shared demodulation reference signal shared DM-RS or a user equipment-specific demodulation reference signal UE-specific DM-RS. The transmission unit, for example, a subframe, includes one or more time-frequency regions with a physical layer function. The shared DM-RS or the UE-specific DM-RS is used to demodulate at least some of the time-frequency regions with a physical layer function.

The shared DM-RS is specific to a user group that includes at least one user equipment. A function and a working principle of the shared DM-RS or the UE-specific DM-RS are as described above, and details are not described herein.

For example, specifically, the network side device maps a known shared demodulation reference signal shared DM-RS or a reference symbol (or a reference sequence) of a UE-specific DM-RS to a known reference signal time-frequency structure. The known shared demodulation reference signal may be stipulated in a protocol, or may be a same signal obtained by a transmit end and a receive end according to a same algorithm stipulated in a protocol. The known reference signal time-frequency structure may be a time-frequency structure that meets one or any combination of the foregoing elements or conditions, as shown in FIG. 2 to FIG. 10.

When the transmission unit is generated, no precoding processing is performed on the shared DM-RS, or same precoding is performed on the shared DM-RS for a plurality of UEs.

In addition, generating the transmission unit may include the following: A scrambling sequence (and a known reference symbol) is used as input to generate a shared DM-RS symbol or a UE-specific DM-RS symbol (for example, a QPSK symbol). A scrambling sequence related to an identifier of a corresponding user group is used to generate the shared DM-RS symbol. For example, scrambling is performed on the shared DM-RS based on an ID that can represent a user equipment group (a group of users). The ID may be an ID allocated by a network, a cell ID, or a group ID. Alternatively, a scrambling sequence may be generated by combining at least two of the foregoing IDs. A scrambling sequence related to an identifier of a corresponding user equipment is used to generate the UE-specific DM-RS symbol.

S102. Send the transmission unit, namely, the shared DM-RS, to at least one user equipment, particularly to a plurality of user equipments, or send the UE-specific DM-RS to one user equipment.

Specifically, the transmission unit has a specific time-frequency structure, for example, the time-frequency structures shown in FIG. 2 to FIG. 10.

Specifically, with reference to FIG. 1b, on a receiver side, correspondingly, the following steps are included.

S201. User equipment receives the transmission unit sent by the network side, where the transmission unit includes the shared demodulation reference signal shared DM-RS or the user equipment-specific demodulation reference signal UE-specific DM-RS.

Specifically, a plurality of user equipments that belong to one user group receive a same shared DM-RS.

Specifically, the transmission unit uses the time-frequency structure described above, for example, the time-frequency structure in one of FIG. 2 to FIG. 10 or a combination of the time-frequency structures in FIG. 2 to FIG. 10.

S202. The user equipment performs estimation demodulation on one or more of time-frequency regions with a physical layer function based on the shared demodulation reference signal, where details are not described herein, or the user equipment demodulates a specific channel of the user equipment based on the UE-specific DM-RS, where details are not described herein.

The method described in FIG. 1b is an implementation of the downlink. Similarly, with reference to FIG. 1c, an implementation of an uplink is further provided. A difference from FIG. 1b lies in that in the uplink, a transmit end is user equipment, and a receive end is a network side device. A transmission unit in the uplink includes the foregoing UE-specific DM-RS, and another working principle is not described herein.

Figure 1C:
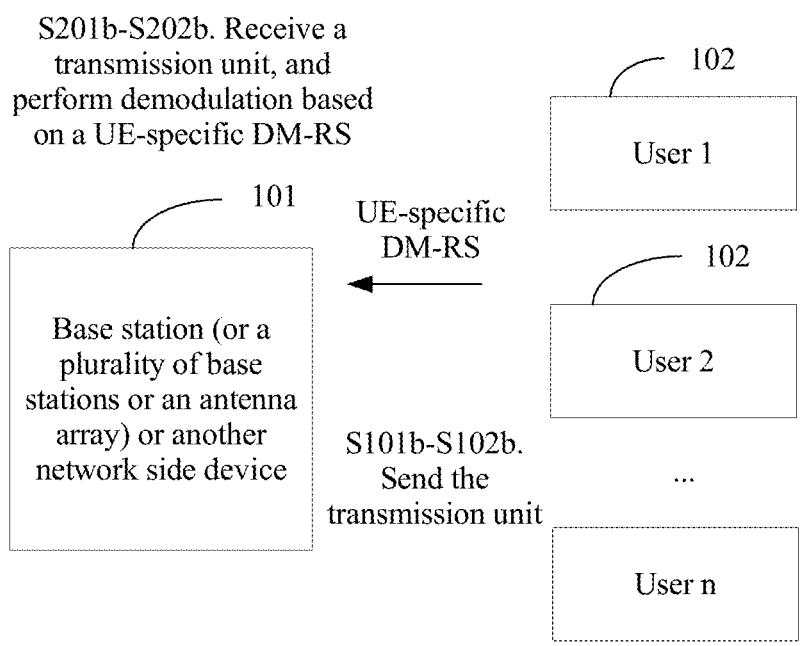

A transmit end device in the systems shown in FIG. 1a, FIG. 1b, and FIG. 1c is further correspondingly provided in this implementation.

The transmit end includes a module configured to generate a transmission unit that includes a shared demodulation reference signal shared DM-RS or a UE-specific DM-RS and a module configured to send the transmission unit to at least one user equipment, particularly to a plurality of user equipments. For a downlink, the transmit end includes a network side device such as a base station, an access point, or another network side device. For an uplink, the transmit end device may be user equipment.

Correspondingly, in an implementation, a receive end device is provided. The receive end device includes:

an obtaining a module, configured to receive a transmission unit sent by a network side, where the transmission unit includes a shared DM-RS or a UE-specific DM-RS; and a processing a module, configured to demodulate one or more time-frequency regions with a physical layer function in the transmission unit based on the shared DM-RS or the UE-specific DM-RS. For a working principle and a process of the processing module, refer to the foregoing implementations, and details are not described in this implementation. For a downlink, the receive end is usually user equipment. For an uplink, the receive end device is a base station, an access point, or another network side device.

Figure 11:
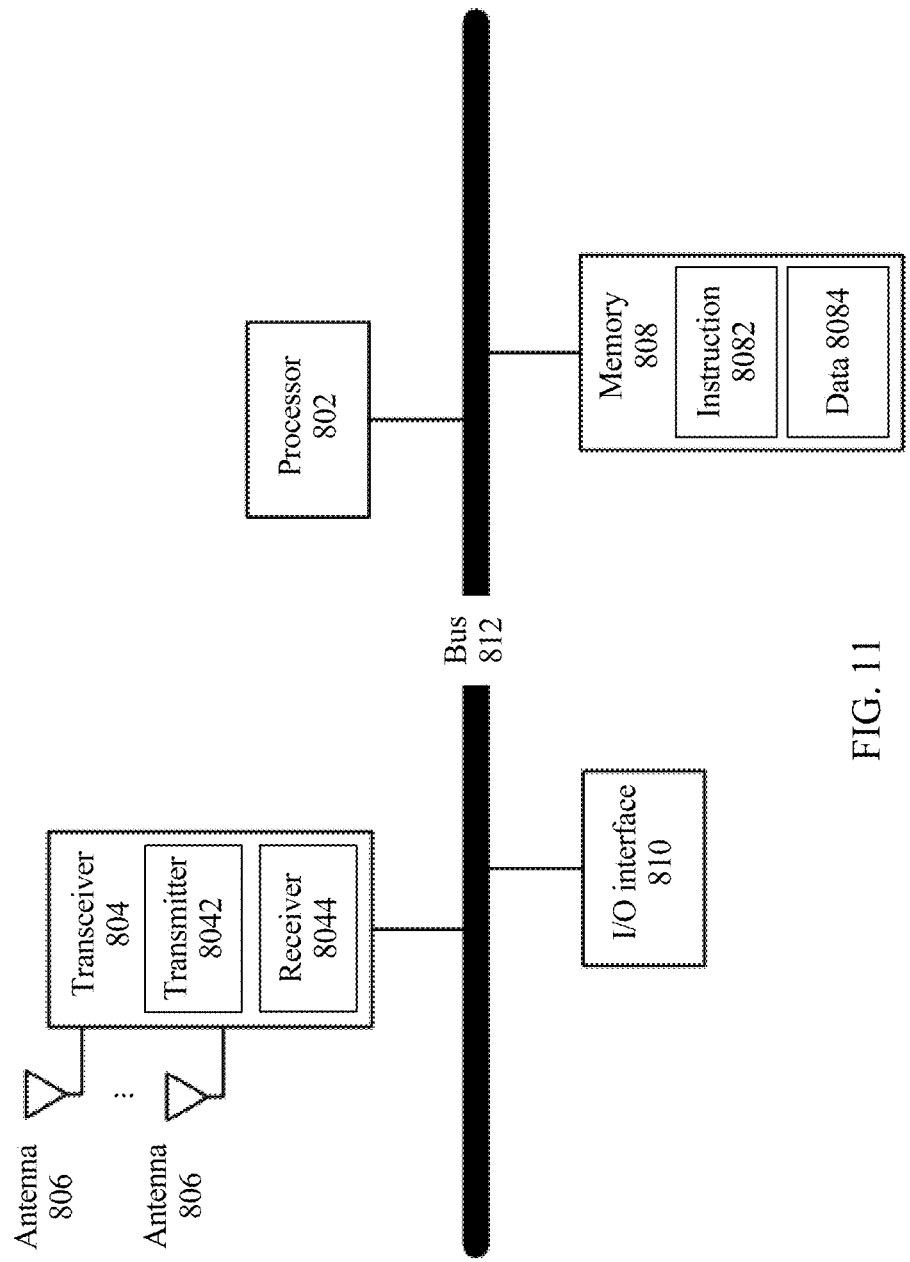
FIG. 11 is a simple schematic diagram of a communications processing apparatus according to an implementation of the present invention.

FIG. 11 is a schematic diagram of a hardware structure of a communications device 900 according to an embodiment of the present invention. As shown in FIG. 9, the communications device 900 includes a processor 902, a transceiver 904, a plurality of antennas 906, a memory 908, an I/O (input/output, Input/output) interface 910, and a bus 912. The transceiver 904 further includes a transmitter 9042 and a receiver 9044. The memory 908 is further configured to store an instruction 9082 and data 9084. In addition, the processor 902, the transceiver 904, the memory 908, and the I/O interface 910 are communicatively connected to each other by using the bus 912, and the plurality of antennas 906 are connected to the transceiver 904.

The processor 902 may be a general purpose processor, for example without limitation to, a central processing unit (Central Processing Unit, CPU), or may be a dedicated processor, for example without limitation to, a digital signal processor (Digital Signal Processor, DSP), an application-specific integrated circuit (Application-Specific Integrated Circuit, ASIC), or a field programmable gate array (Field Programmable Gate Array, FPGA). In addition, the processor 902 may alternatively be a combination of a plurality of processors. Particularly, in the technical solutions provided in the embodiments of the present invention, the processor 902 may be configured to perform, for example, steps S101, S102, S201, and S202 in the method shown in FIG. 1b. The processor 902 may be a processor that is specifically designed to perform the foregoing steps and/or operations, or may be a processor that performs the foregoing steps and/or operations by reading and executing the instruction 9082 stored in the memory 908. The processor 902 may need to use the data 9084 in a process of performing the foregoing steps and/or operations.

The transceiver 904 includes the transmitter 9042 and the receiver 9044. The transmitter 9042 is configured to send a signal by using at least one of the plurality of antennas 906. The receiver 9044 is configured to receive a signal by using at least one of the plurality of antennas 906. Particularly, in the technical solutions provided in the embodiments of the present invention, the transmitter 9042 may be specifically configured to perform, for example, steps S102 and S201 in the method shown in FIG. 1b, or steps S102b and S201b in FIG. 1c by using at least one of the plurality of antennas 906.

The memory 908 may be storage media of a plurality of types, for example, a random access memory (Random Access Memory, RAM), a read-only memory (Read-Only Memory, ROM), a non-volatile RAM (Non-volatile RAM, NVRAM), a programmable ROM (Programmable ROM, PROM), an erasable PROM (Erasable PROM, EPROM), an electrically erasable PROM (Electrically Erasable PROM, EEPROM), a flash memory, an optical memory, and a register. The memory 908 is specifically configured to store the instruction 9082 and the data 9084. The processor 902 may perform the foregoing steps and/or operations by reading and executing the instruction 9082 stored in the memory 908, and may need to use the data 9084 in the process of performing the foregoing operations and/or steps.

The I/O interface 910 is configured to: receive an instruction and/or data from a peripheral device, and output an instruction and/or data to the peripheral device.

It should be noted that in a specific implementation process, the communications device 900 may further include other hardware components, which are not enumerated in this specification.

It should be clear that the present invention is not limited to the particular configuration and processing that are described above and shown in the figures. In addition, for brevity, detailed descriptions of the known method technology are omitted herein. In the foregoing embodiments, some specific steps are described and shown as examples. However, the method process of the present invention is not limited to the specific steps that are described and shown, and a person skilled in the art may make various changes, modifications, or additions, or change a sequence between steps after understanding the spirit of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of reference signal transmission, the method comprising:
generating, by a transmit end, a transmission unit comprising a user equipment—specific demodulation reference signal (UE-specific DM-RS), a first time-frequency region for control, and a second time-frequency region for user-specific data, wherein the first and second time-frequency regions are in a common subframe; and
sending, by the transmit end, the transmission unit to a receive end,
wherein the UE-specific DM-RS is used to demodulate a physical control format indicator channel (PCFICH), a unicast control channel and at least one of the first and second time-frequency regions in the transmission unit for the user-specific data, and wherein the UE-specific DM-RS is carried at an entire operating bandwidth, and
wherein the unicast control channel and the PCFICH use at least one same UE-specific DM-RS port.

2. The method according to claim 1, wherein in the transmission unit, the second time-frequency region for user-specific data is not after the first time-frequency region for control in time domain.

3. The method according to claim 2 further comprising:
allocating, to the receive end, at least one antenna port configured to send the UE-specific DM-RS, wherein reference signals sent on at least some antenna ports are not only used to demodulate the second time-frequency region for user-specific data, but also used to demodulate the first time-frequency region for control.

4. A reference signal transmission method, the method comprising:
receiving, by a receive end, a transmission unit, wherein the transmission unit comprises a user equipment—specific demodulation reference signal (UE-specific DM-RS), a first time-frequency region for control, and a second time-frequency region for user-specific data, wherein the first and second time-frequency regions are in a common subframe; and
demodulating, by the receive end, a physical control format indicator channel (PCFICH), a unicast control channel and at least one of the first and second time-frequency regions in the transmission unit for the user-specific data based on the UE-specific DM-RS,
wherein the UE-specific DM-RS is carried at an entire operating bandwidth, and
wherein the unicast control channel and the PCFICH use at least one same UE-specific DM-RS port.

5. The method according to claim 4, wherein in the transmission unit, the second time-frequency region for user-specific data is not after the first time-frequency region for unicast control.

6. The method according to claim 5 further comprising:
allocating, at the receive end, at least one antenna port configured to receive the UE-specific DM-RS, wherein UE-specific DM-RSs received on at least some antenna ports are used to demodulate the second time-frequency region for user-specific data and the first time-frequency region for control.

7. A method of reference signal transmission, the method comprising:
receiving, by at least one user equipment, a transmission unit comprising, in a common subframe, a shared demodulation reference signal (DM-RS) specific to a user group and a first and a second time-frequency regions,
wherein no precoding is performed on the shared DM-RS, or same precoding is performed on the shared DM-RS for the at least one user equipment in the user group, and
wherein in response to the shared DM-RS comprising one UE-specific DM-RS, the UE-specific DM-RS is carried at an entire operating bandwidth; and
obtaining, by the at least one user equipment, through demodulation by using the UE-specific DM-RS, information in at least one of the time-frequency regions with a physical layer function,
wherein the UE-specific DM-RS is used to demodulate a physical control format indicator channel (PCFICH), a unicast control channel and at least one of the first and second time-frequency regions, and
wherein the unicast control channel and the PCFICH use at least one same shared DM-RS port.

8. The method according to claim 7, wherein the at least one of the time-frequency regions with the physical layer function comprises one or any combination of the following time-frequency regions:
a time-frequency region for shared control, a time-frequency region for unicast control, a time-frequency region for UE-specific control, a time-frequency region for physical control format indication, or a time-frequency region for data multicast/broadcast.

9. The method according to claim 7 further comprising:
receiving, by the user equipment, one or more shared DM-RS ports allocated to the user group, wherein at least some of the shared DM-RS ports are used to demodulate the at least one of the first and the second time-frequency regions in the common subframe with the physical layer function.

10. The method according to claim 8 further comprising:
receiving, by the at least one user equipment, one or more shared DM-RS ports allocated to the user group, wherein at least some of the shared DM-RS ports are used to demodulate the at least one of the first and second time-frequency regions in the common subframe with the physical layer function.

11. The method according to claim 7, further comprising:
generating, by a network side device, the transmission unit before receiving the shared DM-RS at the at least one user equipment; and
sending the transmission unit to the user group for all user equipment in the user group to demodulate the at least one of the first and second time-frequency regions in the common subframe with the physical layer function by using the shared DM-RS.

* * * * *

UNITED STATES PATENT AND TRADEMARK OFFICE
CERTIFICATE OF CORRECTION

| | |
|---|---|
| PATENT NO. | : 11,190,321 B2 |
| APPLICATION NO. | : 16/401686 |
| DATED | : November 30, 2021 |
| INVENTOR(S) | : Wu et al. |

It is certified that error appears in the above-identified patent and that said Letters Patent is hereby corrected as shown below:

On the Title Page

Column 1, Applicant (71): "HUAWEI TECHNOLOGIES CO., LTD., Guangdong (CN)" should read -- HUAWEI TECHNOLOGIES CO., LTD., Shenzhen (CN) --.

Signed and Sealed this
Second Day of August, 2022

Katherine Kelly Vidal
*Director of the United States Patent and Trademark Office*